US 8,001,687 B2

(12) United States Patent
Vukovic

(10) Patent No.: US 8,001,687 B2
(45) Date of Patent: Aug. 23, 2011

(54) METHOD OF FORMING A GEARBOX USING HOLLOW STRUCTURAL STEEL

(75) Inventor: Bernard Vukovic, Edmonton (CA)

(73) Assignee: Namco Machine & Gear Works Ltd., Edmonton (CA)

( * ) Notice: Subject to any disclaimer, the term of this patent is extended or adjusted under 35 U.S.C. 154(b) by 1280 days.

(21) Appl. No.: 11/613,476

(22) Filed: Dec. 20, 2006

(65) Prior Publication Data

US 2008/0148891 A1    Jun. 26, 2008

(51) Int. Cl.
*B23P 17/00*    (2006.01)

(52) U.S. Cl. ............ 29/888; 29/888.01; 29/888.06; 29/897.2; 74/337.5; 74/606 R; 74/607; 180/400

(58) Field of Classification Search ............... 180/400; 29/888, 888.01, 888.06, 890.052, 890.8, 29/897.2; 74/337.5, 606 R, 607
See application file for complete search history.

(56) References Cited

U.S. PATENT DOCUMENTS

| | | | | |
|---|---|---|---|---|
| 4,174,013 A | * | 11/1979 | Yago | 180/6.2 |
| 4,221,138 A | * | 9/1980 | Stewart et al. | 74/607 |
| 4,634,389 A | * | 1/1987 | Eptaminitakis | 440/53 |
| 6,370,976 B1 | * | 4/2002 | Doppling et al. | 74/337.5 |

* cited by examiner

*Primary Examiner* — A. Dexter Tugbang
*Assistant Examiner* — Jeffrey Carley
(74) *Attorney, Agent, or Firm* — Bennett Jones LLP

(57) ABSTRACT

A method of forming a gearbox includes the use of hollow structural steel.

2 Claims, 3 Drawing Sheets

METHOD OF FORMING A GEARBOX USING HOLLOW STRUCTURAL STEEL

FIELD OF THE INVENTION

The present invention relates the use of hollow structural steel in the formation of a gearbox.

BACKGROUND

Hollow structural steel (HSS) is a type of beam with a hollow rectangular cross-section. It is also called structural tubing or hollow structural section as it is available in other materials than steel. The corners are heavily rounded, typically to a radius of approximately twice the wall thickness. The wall thickness is uniform around the section. They are commonly used in welded steel frames where members experience loading in multiple directions.

Square or rectangular HSS is made the same way as pipe. During the manufacturing process flat steel plate is gradually changed in shape to become round where the edges are presented ready to weld. The edges are then welded together to form the mother tube During the manufacturing process the mother tube goes through a series of shaping stands and cold form's the round HSS (mother tube) into the final round, square, or rectangular shape. Most American manufacturers adhere to the ASTM A500 standard, while Canadian manufacturers follow both ASTM A500 and CSA G40.21

In the oil and gas service industry, there is often a need for transfer cases, power take-offs or split-shaft power take-offs that permit machinery to run from torque generated by a vehicle's main engine or a deck engine. The gear boxes for such transfer cases or power take-offs are typically manufactured by welding flat plate steel into rectangular or square boxes, or by casting the case.

SUMMARY OF THE INVENTION

In one aspect, the present invention comprises a method of forming a gearbox from a HSS section. In another aspect, the invention comprises a gearbox formed by the methods described herein.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The present invention relates to a method of forming a gearbox from HSS, and to gearboxes formed from the methods described herein. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, a "gearbox" refers to a case for enclosing a gears, power or torque transfer mechanisms, and other mechanical devices. It may include, but is not limited to transfer cases and power take-off mechanisms.

As used herein, "HSS" refers to the structural material commonly referred to as hollows structural steel, or hollow structural section, and may be square, rectangular, circular or oval in cross-section. HSS is commercially available from numerous manufacturers in a variety of sizes, shapes, and materials.

Figure 1:
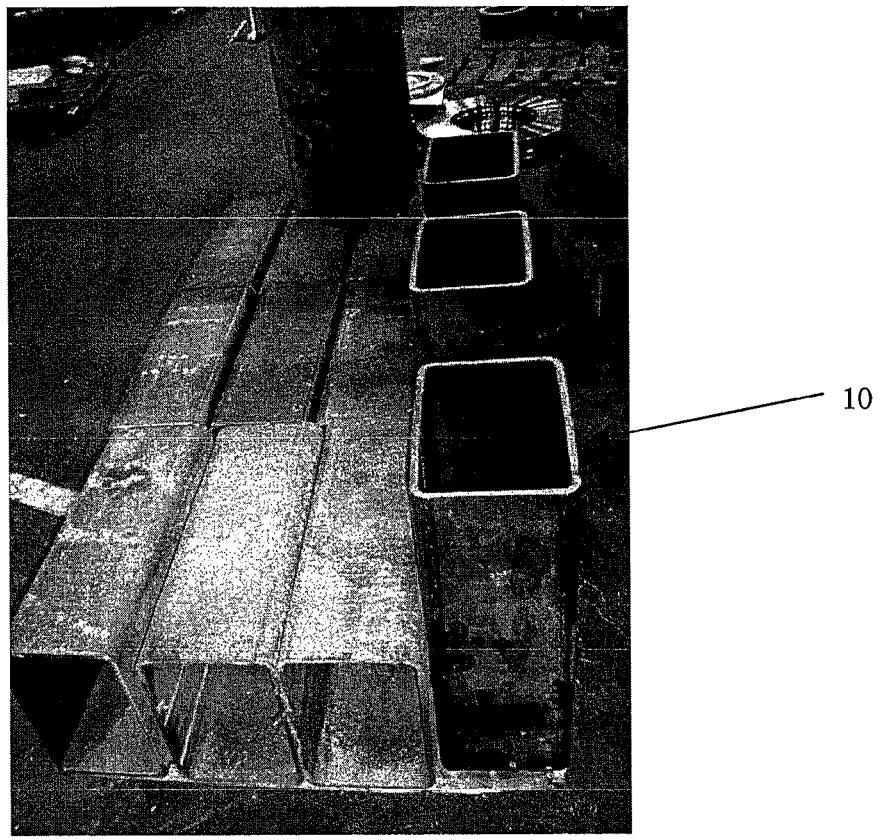
FIG. 1 is a view of sections of HSS which have been cut from a longer length.

In one embodiment, the HSS used is rectangular and formed from steel. HSS is available in lengths ranging from 20 feet to 40 feet. In preparation for use in accordance with the present invention, the lengths are cut into sections (10) of a suitable length, as is shown in FIG. 1.

Figure 2:
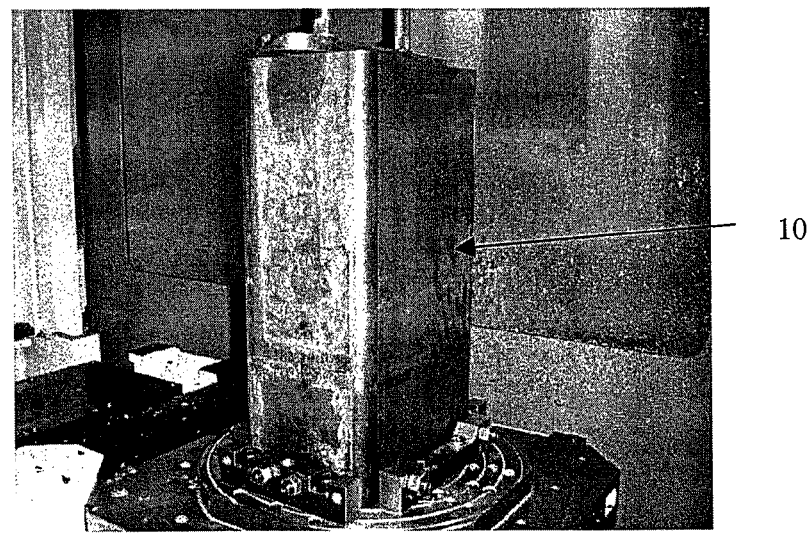
FIG. 2 shows a section of HSS in a stand.
Figure 3:
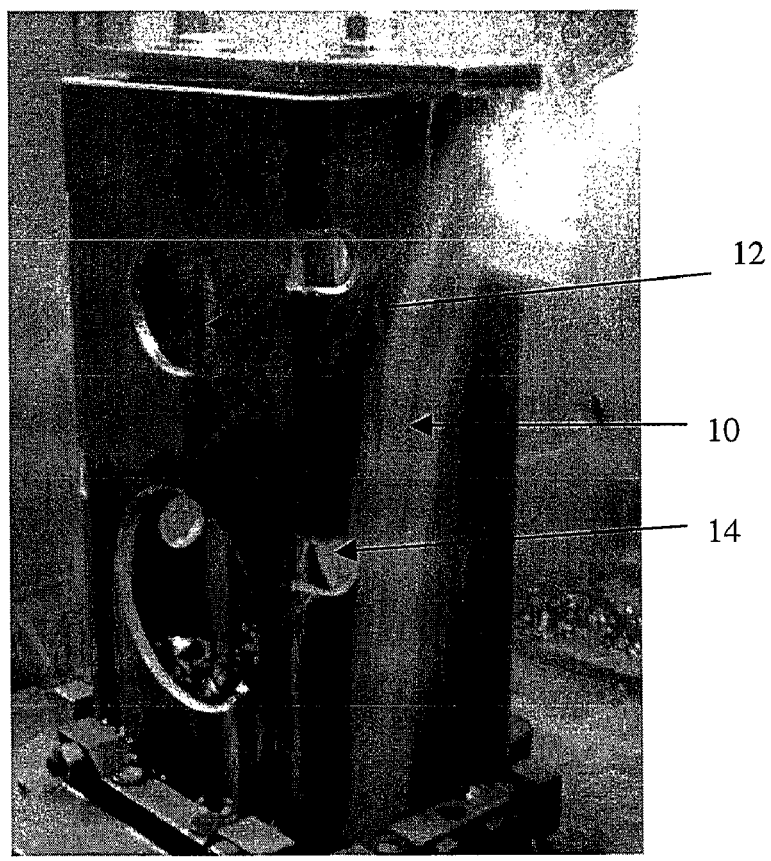
FIG. 3 shows the formation of boreholes and holes for installation of lugs.

The sections are prepared for use by cleaning, and coating if necessary or desired. The section (10) may be mounted in a stand for preparation, as shown in FIG. 2. Bores (12) are then drilled or cut into the section, positioned and sized for the particular application intended. In one embodiment, holes (14) used to mount lugs (16) or other appendages may also be formed, as is shown in FIG. 3.

Figure 4:
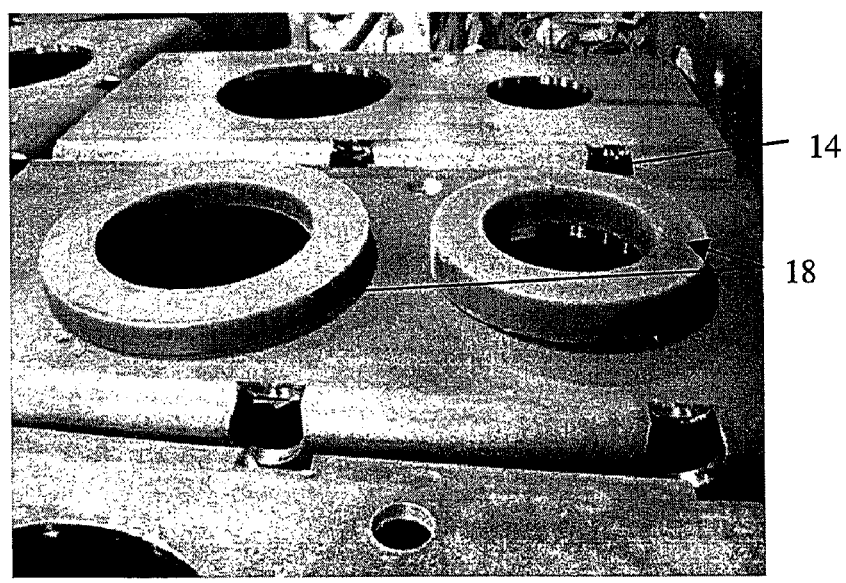
FIG. 4 shows the installation of reinforcement flanges.

Reinforcements for the boreholes, such as the flanges (18) shown in FIG. 4, may then be welded or otherwise secured into place.

Figure 5:
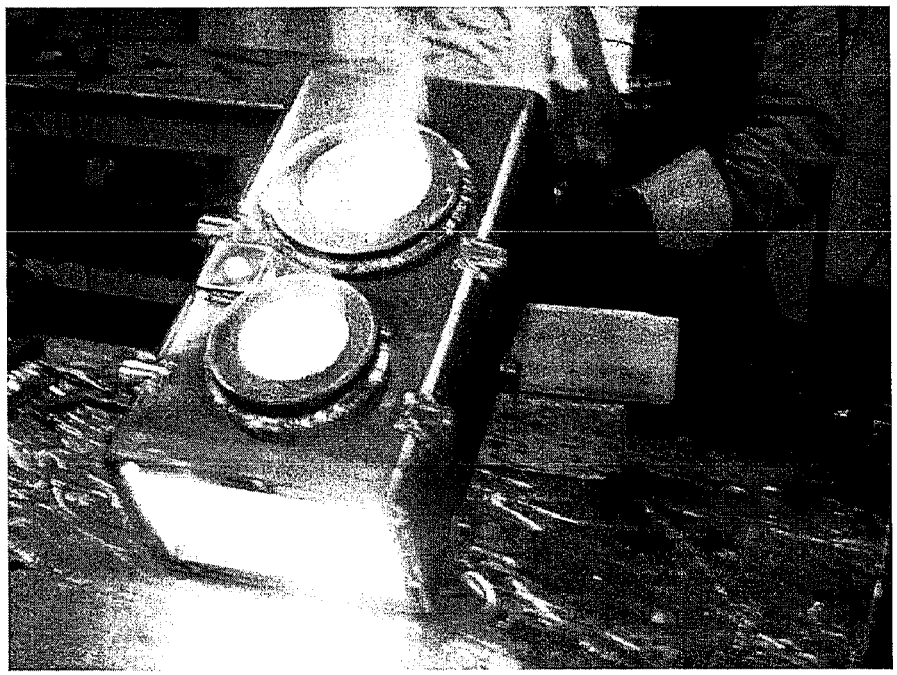
FIG. 5 shows a gearbox being stress relieved after reinforcement flanges are welded.

Once all reinforcing flanges (18) and attachment lugs (16) have been welded into place, the entire assembly may be stress-relieved by heating the section (10) to an elevated temperature, as is shown in FIG. 5. Welding components is a known cause of residual stress, producing large tensile stresses. Stress relief methods for welded joints are known in the art.

The boreholes (12) may then be finish bored to ensure uniformity of opening size and shape. Top (20) and bottom (22) mounting plates may then be attached to close the section (10), which may now be termed a gearbox. In one embodiment, the bottom mounting plate (22) may be welded on, while the top mounting plate may be removeably attached to allow access the interior of the gearbox. The gearbox (10) may be then painted, powder coated, or otherwise finished for final use.

Figure 6:
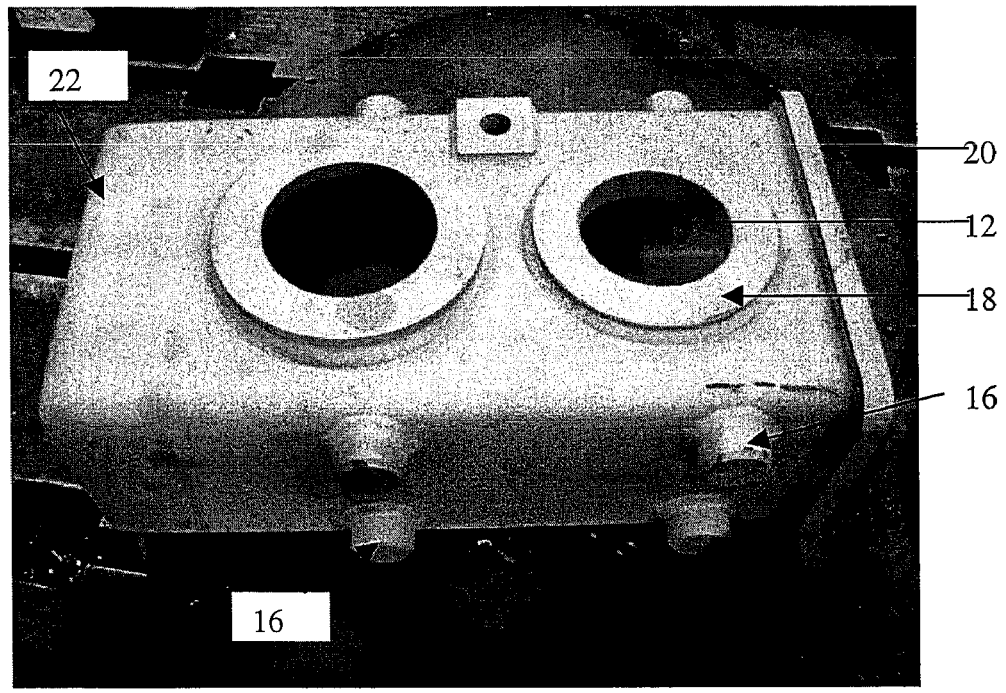
FIG. 6 shows a completed gearbox.

The gearbox shown in FIG. 6 is ready for installation, but does not include any internal machinery.

What is claimed is:

1. A method of forming a gearbox from a length of HSS, comprising the steps of:
    (a) cutting the length of HSS to a suitable length; and
    (b) forming boreholes in appropriate location(s) in the gearbox;
    (c) reinforcing the boreholes with reinforcing flanges welded to the gearbox, and stress relieving the gearbox after the reinforcing flanges are welded on; and
    (d) enclosing one or both ends of the gearbox.

2. The method of claim 1 wherein attachment lugs are attached to the gearbox into lug attachment openings.

* * * * *